(12) United States Patent
O'Neill et al.

(10) Patent No.: US 8,542,975 B2
(45) Date of Patent: Sep. 24, 2013

(54) METHOD TO STABILIZE VIDEO STREAM USING ON-DEVICE POSITIONAL SENSORS

(75) Inventors: Conor Michael O'Neill, Waterloo (CA); Raluca Alina Popa, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 76 days.

(21) Appl. No.: 13/334,759

(22) Filed: Dec. 22, 2011

(65) Prior Publication Data

US 2013/0163947 A1   Jun. 27, 2013

(51) Int. Cl.
*H04N 5/77*   (2006.01)
*H04N 5/92*   (2006.01)

(52) U.S. Cl.
USPC .......................................... 386/227; 386/264

(58) Field of Classification Search
USPC ........................... 386/227, 263, 264, 270, 277
See application file for complete search history.

(56) References Cited

U.S. PATENT DOCUMENTS

| | | | |
|---|---|---|---|
| 7,787,015 B2 | 8/2010 | Stavely | |
| 7,859,569 B2 * | 12/2010 | Grindstaff et al. | 348/208.99 |
| 7,907,838 B2 | 3/2011 | Nasiri et al. | |
| 2004/0189815 A1 | 9/2004 | Kumaki | |
| 2008/0166115 A1 | 7/2008 | Sachs et al. | |
| 2011/0158619 A1 | 6/2011 | Kanayama | |
| 2011/0279691 A1 | 11/2011 | Ishii et al. | |

FOREIGN PATENT DOCUMENTS

| | | |
|---|---|---|
| EP | 1647859 A1 | 4/2006 |
| EP | 1689168 A1 | 8/2006 |
| EP | 1980904 A2 | 10/2008 |
| EP | 2056298 A1 | 5/2009 |
| EP | 2200273 A1 | 6/2010 |
| JP | 2006311145 A | 11/2006 |
| JP | 2009105673 A | 5/2009 |

OTHER PUBLICATIONS

European Extended Search Report; Application No. 11195185.1; Apr. 12, 2012; 12 pages.

* cited by examiner

*Primary Examiner* — Robert Chevalier
(74) *Attorney, Agent, or Firm* — Conley Rose, P.C.; J. Robert Brown, Jr.

(57) ABSTRACT

A video device is provided. The video device comprises a sensor to determine an amount of movement of the video device, a memory component to store video-related information, and a processor to receive movement information from the sensor and to interrupt communication of video-related information to the memory component when the movement information indicates that acceleration of the video device exceeds a threshold.

23 Claims, 4 Drawing Sheets

METHOD TO STABILIZE VIDEO STREAM USING ON-DEVICE POSITIONAL SENSORS

BACKGROUND

Digital video cameras typically include an optical sensor capable of converting an optical image into an electronic signal. Digital information associated with the electronic signal may then be stored in a memory component. An image derived from the electronic signal may be displayed on a viewfinder on the video camera for viewing by the photographer. A moving image might be captured as a series of frames that can be stored and then later replayed in sequence to recreate the moving image.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more aspects of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Implementations of the present disclosure can stabilize the video stream recorded by video cameras and other devices capable of capturing moving images. As used herein, the term "video device" can refer to any apparatus capable of capturing moving images, regardless of whether the apparatus is a stand-alone video camera or a multi-function device with videography capabilities, such as a smart phone, a tablet computer, or a similar apparatus.

In an implementation, a motion sensing component in a video device is capable of measuring the amount of movement the video device is undergoing. When the amount of movement is below a low threshold, it can be assumed that the video device is experiencing only a minimal amount of motion. For example, any movement the video device is undergoing might be caused only by instability in the photographer's hands, in such cases, the video device might continue to record images in its usual manner. When the amount of movement is above a high threshold, it can be assumed that the photographer is deliberately moving the video device in order to follow a moving subject. In such cases, the video device might also continue to record images in its usual manner. When the amount of movement is above the low threshold and below the high threshold, it can be assumed that the video device has undergone a sudden and substantial movement, such as a movement that might be caused when the photographer is jostled or the video device is dropped. In such cases, the video device might temporarily stop sending electronic signals to its memory component, thus preventing the recording of images during the period of jostling, in this way, the playback of a video recording will not include images that entered the video device's lens during the period of jostling, and erratic scenes will be eliminated. In some such cases, the video device might also stop sending live images to its viewfinder.

In an alternative implementation, rather than a low movement threshold and a high movement threshold being defined, an acceleration threshold might be defined. When the movement of a video device exceeds the acceleration threshold, the video device might temporarily stop sending electronic signals to its memory component.

Figure 1:
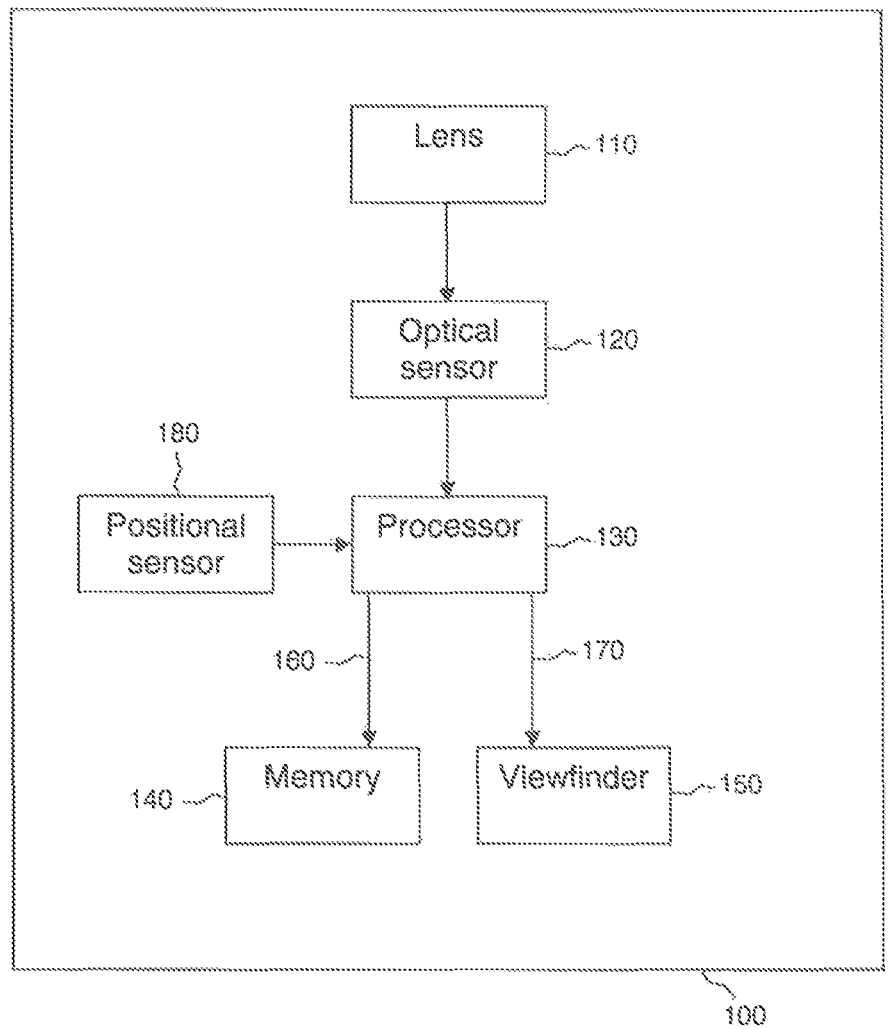
FIG. 1 illustrates components in a video device, according to an implementation of the disclosure.

FIG. 1 is a simplified block diagram of components that might be present in a video device 100 capable of functioning in this manner. The video device 100 includes a lens 110, an optical sensor 120, and a processor 130 that can work in the manner well known to those of skill in the ah to capture video images. More specifically, the lens 110 might send an optical image to the optical sensor 120, which might convert the optical image to an electronic signal that can then be sent to the processor 130. The processor 130 might perform additional processing on the electronic signal and can then send a digital representation of the electronic signal to a memory component 140 for storage. The memory component 140 might he a removable memory card or some other type of storage medium. The processor 130 can also send the electronic signal to a viewfinder 150 for display of the images that are generated by the optical sensor 120 and the processor 130. That is, the processor 130 might create two data streams, a first data stream 160 going to the memory 140 and a second data stream 170 going to the viewfinder 150.

The video device 100 can also include a positional sensor 180 capable of measuring the amount of movement the video device 100 is undergoing. The positional sensor 180 might be a gyroscope, an accelerometer, a magnetometer, or any other component that can measure changes in the position of the video device 100. The positional sensor 180 might provide its motion information to the processor 130.

The video device 100 might also include other components not shown, such as control buttons or other well-known input mechanisms. Also, one or more additional memory components may be present and may store instructions executable by the processor 130 in carrying out the implementations described herein. In addition, it should be understood that the components illustrated in FIG. 1 are not necessarily discrete components as shown, but could be any combination of hardware, firmware, software, and mechanical components capable of capturing video images. For example, the functions of one of the components in FIG. 1 might be shared by one or more of the other components, or the functions of multiple components could be combined into a single component.

In an implementation, the positional sensor 180 can measure the amount of movement of the video device 100 over a period of time and can provide the motion measurements to the processor 130. In one set of implementations, movements of the video device 100 are classified as either low movements, sustained movements, or jolts. In another set of implementations, the acceleration of the video device 100 is determined from the motion measurements, and an acceleration that exceeds a threshold is classified as a jolt.

In the first set of implementations, any movement of the video device 100 that might occur when no deliberate movement of the video device 100 is occurring and when no accidental movement of the video device 100 is occurring could be considered to be less than a low movement threshold and could be classified as a low movement. An accidental movement might be defined as a large-scale movement that is not intended by the photographer, such as movement that might occur when the photographer is jostled or drops the video device 100. An example of a low movement might be the motion caused by minor trembling in the photographer's hands. Any noise in the positional sensor 180 that could appear to be actual motion might also be classified as a low movement. The detection of low movement could result in the video device 100 operating in its standard manner. That is, the memory 140 and the viewfinder 150 could continue to be updated with images generated by the optical sensor 120 and the processor 130.

If the positional sensor 180 measures sustained, large-scale movement of the video device 100, the video device 100 can be considered to exceed a high movement threshold. An example of sustained movement might be the motion that occurs when the photographer moves the video device 100 to follow a moving subject. In such sustained movement cases, the video device 100 could operate in its standard manner by continuing to update the memory 140 and the viewfinder 150 with images generated by the optical sensor 120 and the processor 130.

However, if the positional sensor 180 measures movement of the video device 100 that is larger than the low movement threshold but smaller than the high movement threshold, the movement of the video device 100 could be classified as a "jolt". That is, a jolt may be defined as a brief, sudden movement that is more extensive than a movement that might be expected when a photographer is attempting to keep the video device 100 still and is more sudden than a movement that might be expected when a photographer is deliberately moving the video device 100 to follow a moving object. The low movement threshold and the high movement threshold could be defined in such a way that a movement is classified as a jolt when the size of a movement and the period of time over which that movement occurs are characteristic of the video device 100 being bumped or otherwise moving in an extensive and unintended manner.

In the second set of implementations, a jolt could also be defined in terms of acceleration. That is, small unintentional movements, such as those caused by instability in the photographer's hands, would typically have a small rate of change of velocity over time and would thus have a small acceleration. When a photographer moves the video device 100 to follow a moving object, the photographer typically attempts to do so in a smooth manner, without excessive jerking of the video device 100. Such intentional movements would also be likely to have a small rate of change of velocity over time and thus would also have a small acceleration. Either of these types of movement could be defined to not be jolts and would not result in any change in the traditional operation of the video device 100. On the other hand, large unintentional movements, such as those that might occur when the photographer is jostled or drops the video device 100, would be likely to have a large rate of change of velocity over time and thus would have a large acceleration and could be considered jolts. A large acceleration of the video device 100 might also occur when the photographer deliberately moves the video device 100 very quickly, such as when the photographer suddenly redirects the video device 100 from one subject to another. Such a deliberate fast movement of the video device 100 could also be considered a jolt. Therefore, a jolt could be defined as a movement that exceeds a specified level of acceleration.

In either of these sets of implementations, when a jolt is detected, the processor 130 can temporarily stop sending data to the memory 140. That is, the data stream 160 from the processor 130 to the memory 140 can be temporarily interrupted upon detection of a jolt, and the memory 140 might not be updated with live images during the interruption. As used herein, the term "live image" can refer to the most recent image generated by the optical sensor 120 and the processor 130.

The duration of the temporary interruption of the data stream 160 to the memory 140 might be determined in various ways. In one implementation, no data is sent to the memory 140 for as long as the jolt is being detected. That is, data flow on the data stream 160 to the memory 140 does not resume until the positional sensor 180 detects that the movement of the video device 100 is below the low movement threshold or above the high movement threshold. Alternatively, data flow on the data stream 160 to the memory 140 does not resume until the positional sensor 180 detects that the acceleration of the video device 100 is below the acceleration threshold. In another implementation, the interruption of the data stream 160 might continue for a predetermined period of time. In another implementation, the photographer might take a manual action to cause the resumption of data flow on the data stream 160 to the memory 140. For example, when a jolt occurs, a notification may appear on the viewfinder 150 indicating that recording has been temporarily interrupted and that a manual action is needed for recording to resume. When the photographer wishes to resume recording, the photographer might press a button, tap an area in the viewfinder 150, or take some other action on an input mechanism to cause data flow on the data stream 160 to resume.

Interrupting the data stream 160 in this manner can cause a played back video recording to appear to jump from the last image recorded before a jolt to the first image recorded after the jolt. Throughout the duration of the jolt, the memory 140 could be managed in at least two different manners. In one implementation, no updates are made to the memory 140 during the period of the jolt. In this case, the played back recording would appear to jump without a pause from the last image recorded before the jolt to the first image recorded after the jolt. In another implementation, the last image recorded before the jolt could be copied to the memory 140 at every frame at which a live image would have been stored if the jolt had not occurred. For example, if a jolt lasts for ten frames, a copy of the last image recorded before the jolt could be copied to the memory 140 in each of those ten frames. When the recording is played back, the recording would appear to pause on that image for the duration of ten frames and would then jump to the first image recorded after the jolt.

In an implementation, when a jolt is detected, in addition to the processor 130 temporarily interrupting the data stream 160 to the memory 140, the display of live images on the viewfinder 150 might temporarily be interrupted. In one implementation, the viewfinder 150 might be blank throughout the duration of the jolt. In another implementation, the last image displayed on the viewfinder 150 before the jolt occurred might continue to be displayed on the viewfinder 150 as a temporary placeholder until recording resumes. The appearance of such a still image in the viewfinder 150 could also serve as an indicator that recording has been temporarily interrupted. These implementations could prevent a live image in the viewfinder 150 from moving erratically during the jolt and possibly disorienting the photographer.

However, these implementations could also present a difficulty to the photographer in properly framing an image when the photographer wishes to resume recording, since the viewfinder 150 would display either a blank screen or the last recorded image rather than the scene toward which the video device 100 is currently pointed. The photographer might not be able to determine if the scene is properly framed until after recording has resumed and live images reappear on the viewfinder 150.

In an implementation, such a difficulty could be overcome in the case where the photographer is provided with the option of manually resuming recording after a jolt, as described above. In this implementation, two images could appear in the viewfinder 150 after a jolt has occurred and before recording has resumed. One of the images could be a live image of the scene that is currently entering the lens 110, and the other image could be a still image of the last scene recorded before the jolt occurred. The photographer could view the live image and ensure that the live image is framed as desired before resuming the recording. When recording resumes, the still image might disappear, and only the live image might remain in the viewfinder 150.

This implementation could also provide a smooth transition between the last image recorded before the jolt and the first image recorded after the jolt when the video recording is played back. When the photographer is ready to resume recording, the photographer could compare the two images in the viewfinder 150 and try to match the live image to the still image. If the photographer frames the live image to approximately match the still image and then manually resumes recording, the played back recording could show only a minimal amount of jumping between the last image recorded before the jolt and the first image recorded after the jolt. In this way, the jolt could, in effect, be edited out of the recording.

In another implementation, throughout the duration of the jolt, the viewfinder 150 might display either a blank screen or the last image recorded before the jolt began. When the jolt ends, the viewfinder 150 might resume displaying live images. However, recording of images to the memory 140 might not resume until the photographer provides an input into the video device 100, such as pushing a button or tapping on the viewfinder 150.

In the implementations described above, images are not recorded when a jolt occurs. In another implementation, when a jolt occurs, images are stored either in the memory 140 or in some other temporary storage location. The photographer can decide at a later time whether to retain the images that were recorded during the jolt or to delete those images.

Figure 2A:
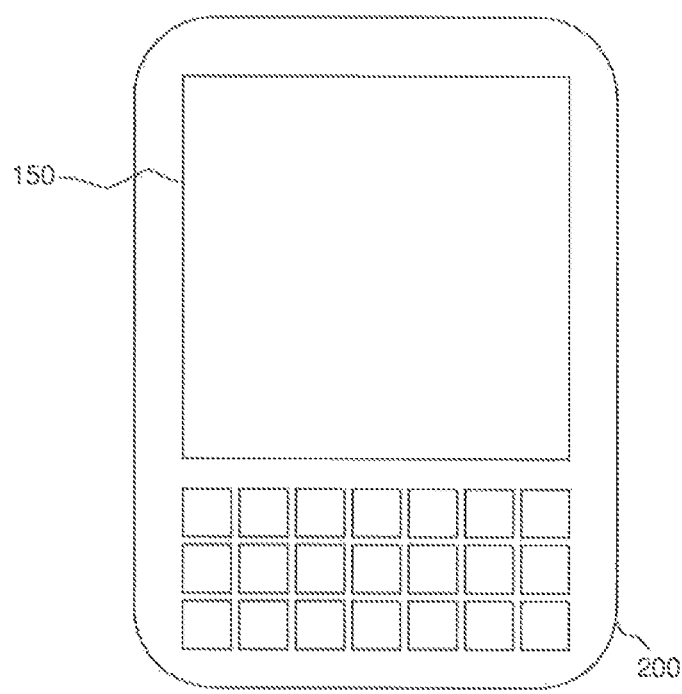
FIGS. 2a and 2b illustrate external components of a smart phone with videography capabilities, according to an implementation of the disclosure.
Figure 2B:
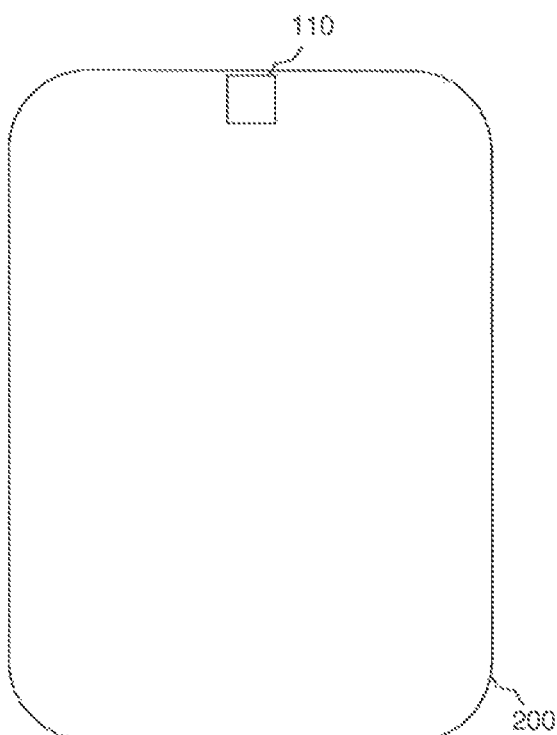

As mentioned above, the video device 100 might be a stand-alone video camera or might be a multi-function device with videography capabilities, such as a smart phone, a tablet computer, or a similar device. FIGS. 2a and 2b depict front and rear views, respectively, of a smart phone 200 that might have components and capabilities similar to those of the video device 100. A display screen on the front of the smart phone 200 can act as the viewfinder 150 when the smart phone 200 is being used as a video camera. The lens 110 might be located on the rear of the smart phone 200. Other components, such as those shown in FIG. 1, may be present internally in the smart phone 200 and are not shown in FIGS. 2a and 2b.

Figure 3:
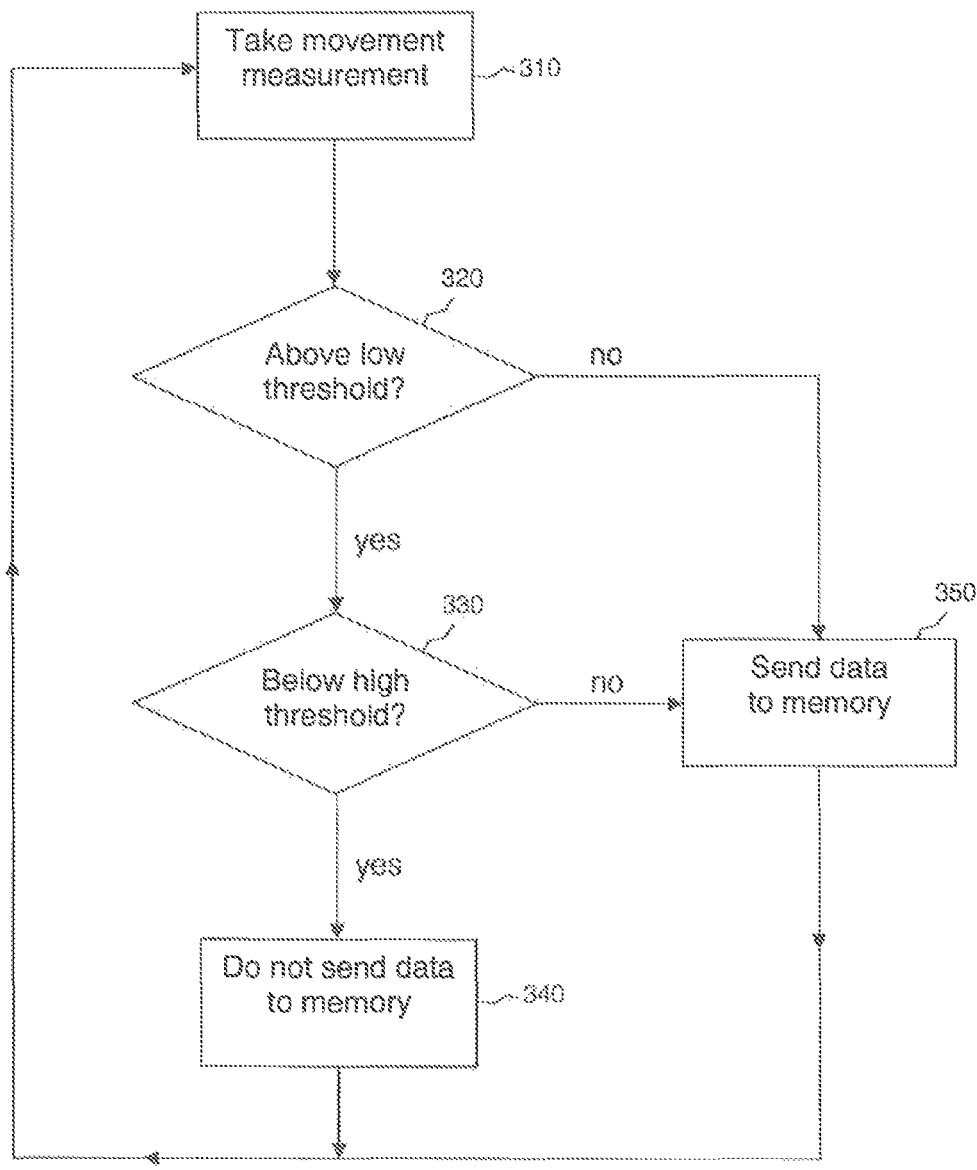
FIG. 3 is a flowchart for a method for stabilizing a video stream, according to an implementation of the disclosure.

FIG. 3 illustrates a method for stabilizing a video stream in the implementations where a low movement threshold and a high movement threshold are used. At box 310, a positional sensor on a video device takes a movement measurement. At box 320, it is determined whether the movement is above a low movement threshold. If the movement is above the low movement threshold then, at box 330, it is determined whether the movement is below a high movement threshold. If movement is below the high movement threshold then, at box 340, video-related data is not sent to a memory component on the video device. One of skill in the art will recognize that the decisions at boxes 320 and 330 do not necessarily need to occur in the order shown. If it is determined at box 320 that the movement is not above the low movement threshold, or if it is determined at box 330 that the movement is not below the high movement threshold then, at box 350, video-related data is sent to the memory component in the traditional manner. After the determination is made whether or not to send data to the memory component, another movement measurement might be made at box 310, and the procedure can be repeated.

As mentioned above, the implementations described herein may be implemented by a smart phone or some other type of user equipment (UE). One exemplary device is described below with regard to FIG. 4 and may be equivalent to the smart phone illustrated in FIG. 2. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 4:
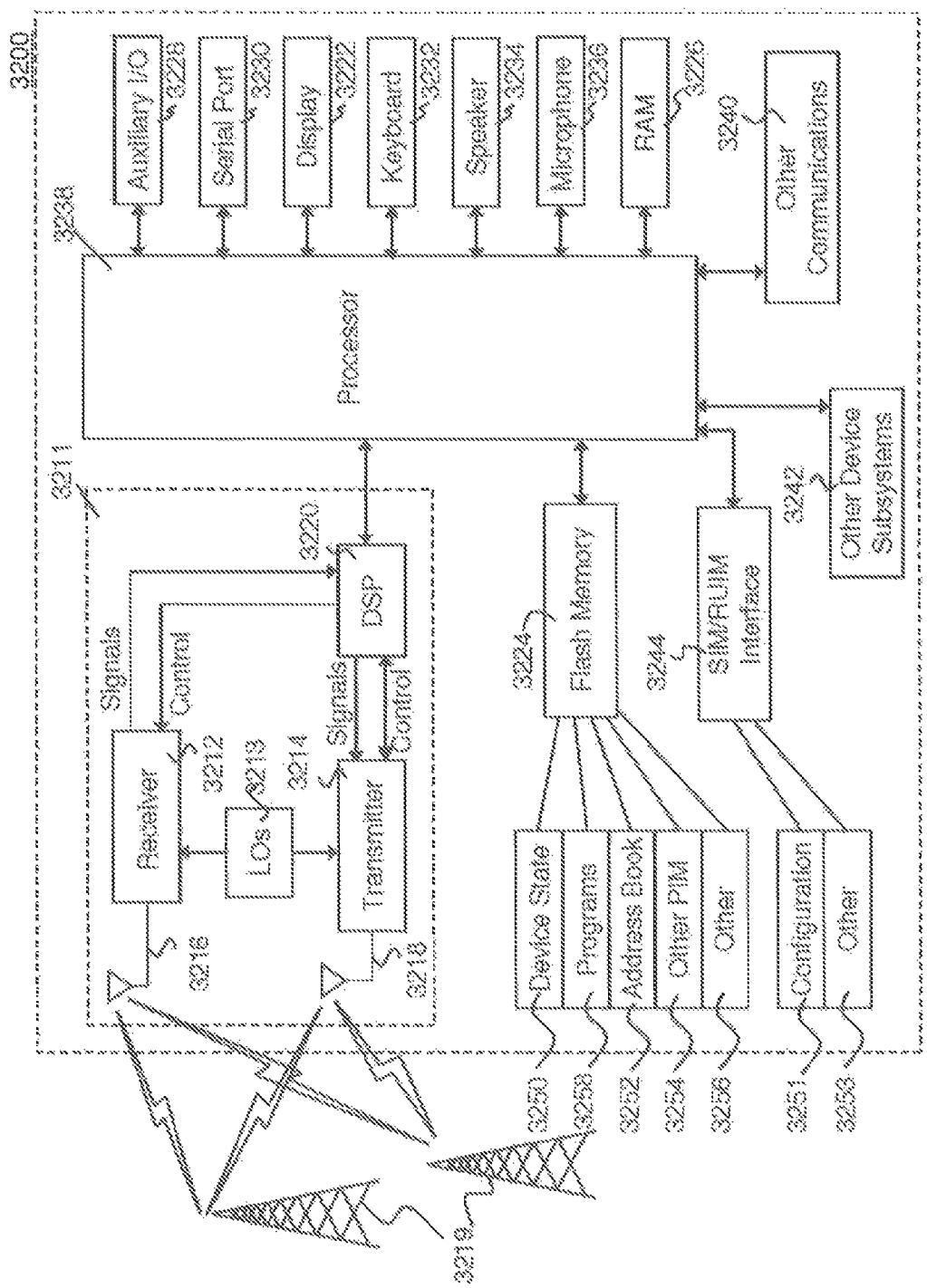
FIG. 4 illustrates a device suitable for implementing the several aspects of the present disclosure.

When required network registration or activation procedures have been completed, UE 3200 may send and receive communication signals over the network 3219. As illustrated in FIG. 4, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3213, DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3236 which controls the overall operation of the device. The processor 3238 of FIG. 4 may be equivalent to the processor 130 of FIG. 1. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 4 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3233, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a date communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3223. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 4 may normally be implemented in a personal digital assistant (PDA)-type UE for which synchronization with a users desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

In an implementation, a method for stabilizing a video stream being captured by a video device is provided. The method comprises, when movement of the video device is detected by a sensor on the video device to be greater than a low threshold and less than a high threshold, temporarily interrupting communication of video-related information to a memory component on the video device.

In another implementation, a video device is provided. The video device comprises a sensor to determine an amount of movement of the video device, a memory component to store video-related information, and a processor coupled to the sensor and the memory component. The processor is configured to receive movement information from the sensor and to interrupt communication of video-related information to the memory component when the movement information indicates that acceleration of the video device exceeds a threshold.

In another implementation, a method for managing a video recording on a video device is provided. The method comprises interrupting communication of video-related information to a memory component on the video device when movement information provided by a sensor on the video device indicates that acceleration of the video device exceeds a threshold.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for stabilizing a video stream being captured by a video device, comprising:
   when movement of the video device is detected by a sensor on the video device to be greater than a low threshold and less than a high threshold, temporarily interrupting communication of video-related information to a memory component on the video device,
   wherein, during the temporary interruption, an image that was recorded before the temporary interruption is copied into the memory component in each frame of the video stream that would have contained a live image if the temporary interruption had not occurred.

2. The method of claim 1, wherein movement equal to or less than the low threshold is substantially similar to an amount of movement that occurs when no deliberate movement of the video device is occurring and no accidental movement of the video device is occurring.

3. The method of claim 1, wherein movement equal to or greater than the high threshold is substantially similar to an amount of movement that occurs when the video device is following a moving object.

4. The method of claim 1, wherein the temporary interruption ends upon the occurrence of at least one of:
   detecting a movement that is not greater than the low threshold;
   detecting a movement that is not smaller than the high threshold;
   expiration of a predetermined period of time; and
   manual selection of an input mechanism.

5. The method of claim 1, wherein an indicator appears on a viewfinder on the video device indicating that the temporary interruption has occurred.

6. The method of claim 1, wherein, when movement of the video device is detected by the sensor to be greater than the low threshold and less than the high threshold, display of live images on a viewfinder on the video device is temporarily interrupted.

7. The method of claim 6, wherein the image that was recorded before the temporary interruption is displayed on the viewfinder during the temporary interruption.

8. The method of claim 6, wherein, when movement of the video device is detected by the sensor to be less than the low threshold or greater than the high threshold, display of live images on the viewfinder resumes, but communication of video-related information to the memory component does not resume until the video device receives a manual input.

9. The method of claim 4, wherein, when the temporary interruption can be ended by manual selection of an input mechanism, two images are displayed on a viewfinder on the video device during the temporary interruption, the first image being an image that was recorded before the temporary interruption, and the second image being a live image.

10. A video device, comprising:
    a sensor to determine an amount of movement of the video device;
    a memory component to store video-related information; and
    a processor coupled to the sensor and the memory component, the processor configured to receive movement information from the sensor and to interrupt communication of video-related information to the memory component when the movement information indicates that acceleration of the video device exceeds a threshold,
    wherein the interruption ends upon the occurrence of at least one of:
       detection of acceleration that does not exceed the threshold;
       expiration of a predetermined period of time; and
       manual selection of an input mechanism, and
    wherein, when the interruption can be ended by manual selection of an input mechanism, a first image that was recorded before the interruption and a second, live image are displayed on a viewfinder on the video device during the interruption.

11. The video device of claim 10, wherein an indicator appears on a viewfinder on the video device indicating that the interruption has occurred.

12. The video device of claim 10, wherein display of live images on the viewfinder is interrupted when the acceleration of the video device exceeds the threshold.

13. The video device of claim 12, wherein, when the acceleration of the video device no longer exceeds the threshold, display of live images on the viewfinder resumes, but communication of video-related information to the memory component does not resume until the video device receives the manual selection.

14. The video device of claim 10, wherein, during the interruption, the first image is retrieved from the memory component and placed in a video recording stored in the memory component in each frame of the video recording that would have contained a live image if the interruption had not occurred.

15. A method for managing a video recording on a video device, comprising:
    interrupting communication of video-related information to a memory component on the video device when movement information provided by a sensor on the video device indicates that acceleration of the video device exceeds a threshold wherein display of live images on a viewfinder on the video device is interrupted when the acceleration of the video device exceeds the threshold, and wherein an image that was recorded before the interruption of communication of video-related information is displayed on the viewfinder during the interruption of communication of video-related information.

16. The method of claim 15, wherein the interruption ends upon the occurrence of at least one of:
   detection of acceleration that does not exceed the threshold;
   expiration of a predetermined period of time; and
   manual selection of an input mechanism.

17. The method of claim 15, wherein an indicator appears on a viewfinder on the video device indicating that the interruption has occurred.

18. The method of claim 15, wherein, when the acceleration of the video device no longer exceeds the threshold, display of live images on the viewfinder resumes, but communication of video-related information to the memory component does not resume until the video device receives a manual input.

19. The method of claim 16, wherein, when the interruption can be ended by manual selection of an input mechanism, the image that was recorded before the interruption of communication of video-related information and a second, live image are displayed on a viewfinder on the video device during the interruption.

20. The method of claim 15, wherein, during the interruption, the image that was recorded before the interruption is retrieved from the memory component and placed in the video recording in each frame of the video recording that would have contained a live image if the interruption had not occurred.

21. A video device, comprising:
   a sensor to determine an amount of movement of the video device;
   a memory component to store video-related information; and
   a processor coupled to the sensor and the memory component, the processor configured to receive movement information from the sensor and to interrupt communication of video-related information to the memory component when the movement information indicates that acceleration of the video device exceeds a threshold,
   wherein display of live images on a viewfinder on the video device is interrupted when the acceleration of the video device exceeds the threshold, and
   wherein an image that was recorded before the interruption of communication of video-related information is displayed on the viewfinder during the interruption of communication of video-related information.

22. A video device, comprising:
   a sensor to determine an amount of movement of the video device;
   a memory component to store video-related information; and
   a processor coupled to the sensor and the memory component, the processor configured to receive movement information from the sensor and to interrupt communication of video-related information to the memory component when the movement information indicates that acceleration of the video device exceeds a threshold,
   wherein display of live images on a viewfinder on the video device is interrupted when the acceleration of the video device exceeds the threshold, and
   wherein, when the acceleration of the video device no longer exceeds the threshold, display of live images on the viewfinder resumes, but communication of video-related information to the memory component does not resume until the video device receives a manual input.

23. A video device, comprising:
   a sensor to determine an amount of movement of the video device;
   a memory component to store video-related information; and
   a processor coupled to the sensor and the memory component, the processor configured to receive movement information from the sensor and to interrupt communication of video-related information to the memory component when the movement information indicates that acceleration of the video device exceeds a threshold,
   wherein, during the interruption, an image that was recorded before the interruption is retrieved from the memory component and placed in a video recording stored in the memory component in each frame of the video recording that would have contained a live image if the interruption had not occurred.

* * * * *

UNITED STATES PATENT AND TRADEMARK OFFICE
CERTIFICATE OF CORRECTION

PATENT NO. : 8,542,975 B2  Page 1 of 1
APPLICATION NO. : 13/334759
DATED : September 24, 2013
INVENTOR(S) : Conor Michael O'Neill et al.

It is certified that error appears in the above-identified patent and that said Letters Patent is hereby corrected as shown below:

On the Title Page

Line 73, Assignee replace "Blackberry Limited" with – "BlackBerry Limited"

Signed and Sealed this
Twelfth Day of November, 2013

Teresa Stanek Rea
*Deputy Director of the United States Patent and Trademark Office*